(12) United States Patent
Miura et al.

(10) Patent No.: US 9,262,400 B2
(45) Date of Patent: Feb. 16, 2016

(54) NON-TRANSITORY COMPUTER READABLE MEDIUM AND INFORMATION PROCESSING APPARATUS AND METHOD FOR CLASSIFYING MULTILINGUAL DOCUMENTS

(71) Applicant: FUJI XEROX CO., LTD, Minato-ku, Tokyo (JP)

(72) Inventors: Yasuhide Miura, Kanagawa (JP); Keigo Hattori, Kanagawa (JP); Tomoko Okuma, Kanagawa (JP); Shigeyuki Sakaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/505,086

(22) Filed: Oct. 2, 2014

(65) Prior Publication Data
US 2015/0254228 A1 Sep. 10, 2015

(30) Foreign Application Priority Data
Mar. 10, 2014 (JP) .................................. 2014-045953

(51) Int. Cl.
*G06F 17/27* (2006.01)
*G06F 17/28* (2006.01)

(52) U.S. Cl.
CPC .......... *G06F 17/2765* (2013.01); *G06F 17/275* (2013.01); *G06F 17/28* (2013.01)

(58) Field of Classification Search
CPC .... G06F 17/2765; G06F 17/28; G06F 17/275
USPC .......................... 704/4, 8, 217, 218, 222, 245
See application file for complete search history.

(56) References Cited

U.S. PATENT DOCUMENTS

| 7,457,808 B2 * | 11/2008 | Gaussier ................. G06K 9/623 |
| 8,612,203 B2 * | 12/2013 | Foster ................. G06F 17/2827 704/2 |
| 2005/0071152 A1 * | 3/2005 | Morimoto ........... G06F 17/2765 704/10 |
| 2013/0024183 A1 * | 1/2013 | Cardie .............. G06F 17/30722 704/8 |

FOREIGN PATENT DOCUMENTS

| EP | 0 750 266 B1 | 12/1996 |
| JP | 9-6799 A | 1/1997 |
| JP | 2005-107705 A | 4/2005 |

OTHER PUBLICATIONS

Xiaojun Wan, "Using Bilingual Knowledge and Ensemble Techniques for Unsupervised Chinese Sentiment Analysis", Institute of Compute Science and Technology, Peking University, 2008, pp. 553-561.

* cited by examiner

Primary Examiner — Marcellus Augustin
(74) Attorney, Agent, or Firm — Sughrue Mion, PLLC (57) ABSTRACT

A non-transitory computer readable medium storing a program is provided. A process of the program includes: extracting, concerning first document information including texts, a word sense associated with a word in each text; setting a word sense to be a teacher signal; creating a first topic model by using the teacher signal; estimating a topic of each text by using the first topic model; generating a learning model by using the topic as a feature and the teacher signal as a category; extracting, concerning second document information including texts, a word sense associated with a word in each text; setting a word sense to be a teacher signal; creating a second topic model by using the teacher signal; estimating a topic of each text by using the second topic model; and estimating a category of each text by using the topic as a feature and the learning model.

6 Claims, 7 Drawing Sheets

/116

| TEACHER SIGNAL (SID) | WORDS FORMING A TOPIC (SCORE) |
|---|---|
| 1 | suki(0.11), sugoku(0.08), eiga(0.08), saiko(0.03), ... |
| 2 | konomu(0.13), suki(0.12), F-san(0.04), taipu(0.02), ... |
| 4 | eiga(0.22), cinema(0.11), yakusha(0.08), miru(0.04), ... |
| : | : |

/119

| CATEGORY | TEXT |
|---|---|
| POSITIVE | eiga A mitai-na eiga wa sugoku suki! |
| POSITIVE | F-san wa kekko konomi-no yakusha dana. |
| NEGATIVE | eiga E wa nani ga iitai no ka imi fumei... |
| : | : |

| TEXT |
|---|
| A movie I like the most is Movie A. |
| I love Film B. It is the best movie I have ever seen. |
| Movie C looks like Movie D. Boo! |
| ⋮ |

| SID | LANGUAGE | ENTRY WORD | WORD CLASS | WORD SENSE |
|---|---|---|---|---|
| 1 | ENGLISH | like, love | verb | like something very much |
| | JAPANESE | suki, aisuru | | |
| 2 | ENGLISH | like | verb | think that something is good or right |
| | JAPANESE | suki, konomu | | |
| 3 | ENGLISH | like | adjective | similar to something |
| 4 | ENGLISH | movie, film | noun | means to express a story with images and sound |
| | JAPANESE | eiga | | |
| ⋮ | ⋮ | ⋮ | ⋮ | ⋮ |

| TID | TEACHER SIGNAL | TEXT |
|---|---|---|
| 1 | POSITIVE | I love an example.org movie http://example.org/1 |
| 2 | NEGATIVE | Movie B was not a movie of my type. |
| 3 | POSITIVE | I just saw Movie D. It was way better than I expected. |
| ⋮ | ⋮ | ⋮ |

| TEACHER SIGNAL (SID) | WORDS FORMING A TOPIC (SCORE) |
|---|---|
| 1 | love(0.12), like(0.11), best(0.06), ever(0.06), ⋯ |
| 2 | like(0.10), Movie A(0.09), most(0.08), Actor F(0.04), ⋯ |
| 3 | like(0.18), look(0.09), Movie C(0.04), boo(0.02), ⋯ |
| 4 | movie(0.20), film(0.19), see(0.07), watch(0.06), ⋯ |
| ⋮ | ⋮ |

| TEXT |
| --- |
| eiga A mitai-na eiga wa sugoku suki! |
| F-san wa kekko konomi-no yakusha dana. |
| eiga E wa nani ga iitai no ka imi fumei··· |
| ⋮ |

FIG. 9
116

| TEACHER SIGNAL (SID) | WORDS FORMING A TOPIC (SCORE) |
| --- | --- |
| 1 | suki(0.11), sugoku(0.08), eiga(0.08), saiko(0.03), ··· |
| 2 | konomu(0.13), suki(0.12), F-san(0.04), taipu(0.02), ··· |
| 4 | eiga(0.22), cinema(0.11), yakusha(0.08), miru(0.04), ··· |
| ⋮ | ⋮ |

FIG. 10
119

| CATEGORY | TEXT |
| --- | --- |
| POSITIVE | eiga A mitai-na eiga wa sugoku suki! |
| POSITIVE | F-san wa kekko konomi-no yakusha dana. |
| NEGATIVE | eiga E wa nani ga iitai no ka imi fumei··· |
| ⋮ | ⋮ |

NON-TRANSITORY COMPUTER READABLE MEDIUM AND INFORMATION PROCESSING APPARATUS AND METHOD FOR CLASSIFYING MULTILINGUAL DOCUMENTS

CROSS-REFERENCE TO RELATED APPLICATIONS

This application is based on and claims priority under 35 USC 119 from Japanese Patent Application No. 2014-045953 filed Mar. 10, 2014.

BACKGROUND (i) Technical Field

The present invention relates to a non-transitory computer readable medium storing a multilingual document classifying program and an information processing apparatus and method.

(ii) Related Art

An information processing apparatus for classifying multilingual documents has been proposed as an example of the related art.

SUMMARY

According to an aspect of the invention, there is provided a non-transitory computer readable medium storing a program causing a computer to execute a process for classifying multilingual documents. The process includes: extracting, concerning first document information including plural supervised texts of a first language, a word sense associated with a word included in each of the plural supervised texts in the first document information from predetermined word-sense information; setting an extracted word sense to be a teacher signal for each of the plural supervised texts included in the first document information; creating a first topic model by executing supervised topic modeling on the first document information by using the set teacher signal for each of the plural supervised texts included in the first document information; estimating a topic of each of the plural supervised texts included in the first document information by using the created first topic model; generating a learning model by executing supervised machine learning by using, as a feature, the estimated topic of each of the plural supervised texts included in the first document information and by using, as a category, the teacher signal for each of the plural supervised texts in the first document information; extracting, concerning second document information including plural supervised texts of a second language and concerning a field identical to a field of the first document information, a word sense associated with a word included in each of the plural supervised texts in the second document information from the predetermined word-sense information; setting an extracted word sense to be a teacher signal for each of the plural supervised texts included in the second document information; creating a second topic model by executing supervised topic modeling on the second document information by using the set teacher signal for each of the plural supervised texts included in the second document information; estimating a topic of each of the plural supervised texts included in the second document information by using the created second topic model; and estimating a category of each of the plural supervised texts included in the second document information by using, as a feature, the estimated topic of an associated supervised text and by using the generated learning model.

BRIEF DESCRIPTION OF THE DRAWINGS

An exemplary embodiment of the present invention will be described in detail based on the following figures, wherein.

DETAILED DESCRIPTION (Configuration of Information Processing Apparatus)

Figure 1:
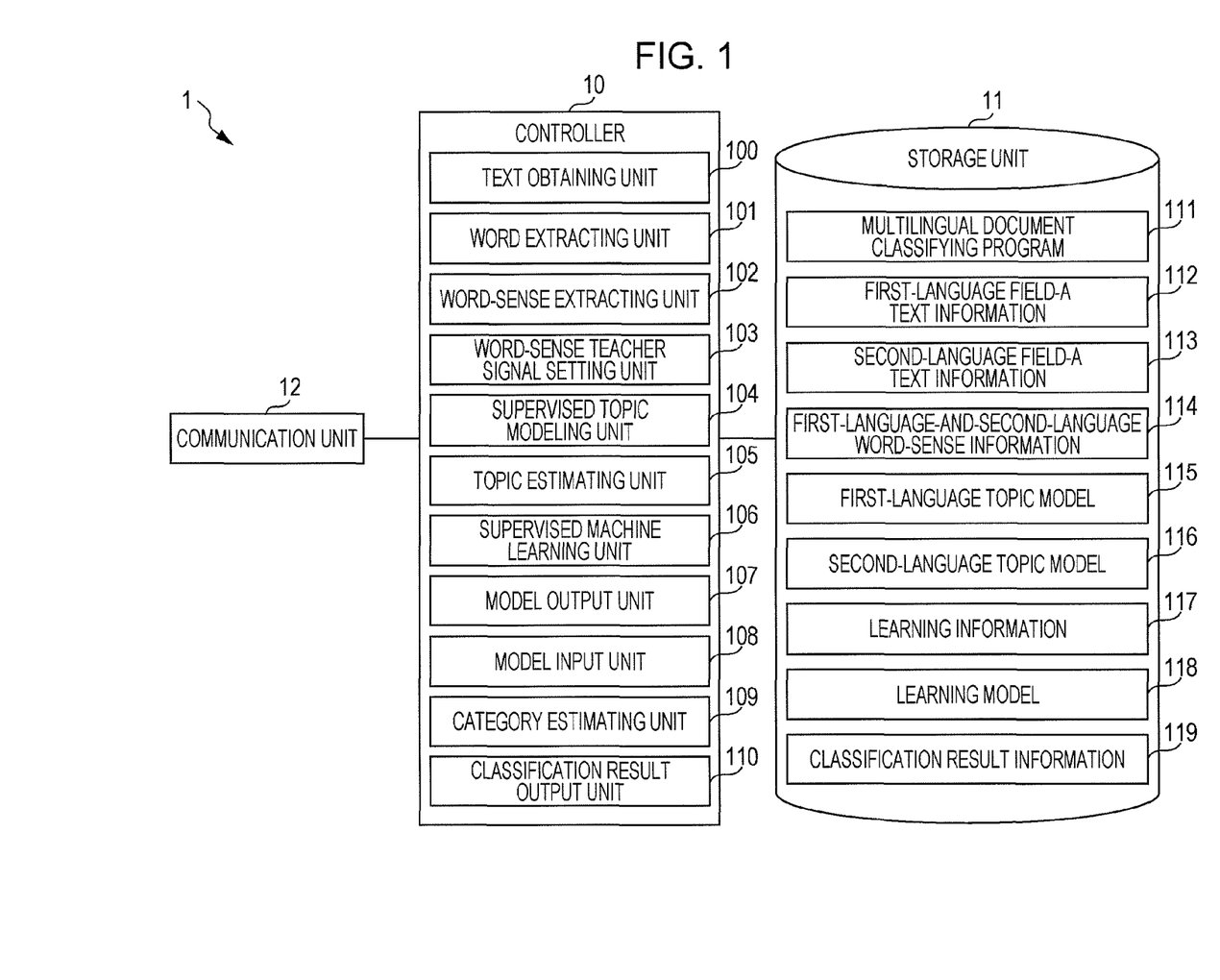
FIG. 1 is a block diagram illustrating an example of the configuration of an information processing apparatus according to an exemplary embodiment.

FIG. 1 is a block diagram illustrating an example of the configuration of an information processing apparatus 1 according to an exemplary embodiment.

The information processing apparatus 1 classifies items of document information concerning the same field but in different languages. Classifying or classification refers to labeling items of document information on the basis of the content thereof. As a label used in the classification, a two-valued label indicating "positive" or "negative" may be used, or a multi-valued label may be used.

In this exemplary embodiment discussed below, the information processing apparatus 1 handles English as a first language and Japanese as a second language, and classifies texts concerning the field of movies. It is assumed that the first language and the second language are concerned with the same field and that there are more classified texts of the first language than those of the second language. That is, the first language is subjected to supervised machine learning, while the second language is a subject to be classified.

The type of language and the field may be changed if necessary. For example, as the field, movies or football may be used, or a broader term than this, such as the culture or sport, may be used. The field may be set automatically from metadata of texts. The field can be set easily even if it is manually set.

The information processing apparatus 1 is constituted by, for example, a central processing unit (CPU), and includes a controller 10, a storage unit 11, and a communication unit 12. The controller 10 controls the individual components and executes various programs. The storage unit 11 is constituted by a storage medium, for example, a flash memory, and stores information therein. The communication unit 12 communicates with an external source via a network.

The controller 10 executes a multilingual document classifying program 111, which will be discussed later, so as to function as a text obtaining unit 100, a word extracting unit 101, a word-sense extracting unit 102, a word-sense teacher signal setting unit 103, a supervised topic modeling unit 104, a topic estimating unit 105, a supervised machine learning unit 106, a model output unit 107, a model input unit 108, a category estimating unit 109, and a classification result output unit 110.

The text obtaining unit 100 obtains a text to be processed from first-language field-A text information 112 (first document information) or second-language field-A text information 113 (second document information) stored in the storage unit 11. When obtaining a text, a single text may be obtained or all texts may be obtained.

The word extracting unit 101 extracts words from a text obtained by the text obtaining unit 100 by using Part of Speech Tagger in the case of English or a morphological analyzer in the case of Japanese.

The word-sense extracting unit 102 extracts a word-sense associated with a word extracted by the word extracting unit 101. A word-sense associated with a word is obtained in the following manner. A word is converted into a lemma of the word in the case of English or into an original form of the word in the case of Japanese, and then, by referring to first-language-and-second-language word-sense information 114, a word sense of an entry word that matches the extracted word is obtained. If the first-language-and-second-language word-sense information 114 includes word class information, the condition that the word class of the extracted word matches that of the associated entry word may be included as conditions for obtaining a word sense. When searching for an entry word that matches the extracted word, processing for ignoring the differences between upper cases and lower cases of alphabetical letters or the differences between half-width and full-width characters may be performed by using a text normalization method. As the text normalization method, a method such as Unicode Normalization is employed.

A word sense refers to a meaning of a word registered as an entry of a dictionary, and is a language-independent element. The word senses widely include meanings of words included in multilingual dictionaries and concept dictionaries (concept dictionary of the EDR Electronic Dictionary and WordNet). The word sense may also be referred to as a "concept" or a "synset".

The word-sense teacher signal setting unit 103 sets a word sense extracted by the word-sense extracting unit 102 as a teacher signal for a text. A teacher signal refers to a correct answer for data based on certain criteria.

The supervised topic modeling unit 104 performs supervised topic modeling on a text by using a teacher signal set by the word-sense teacher signal setting unit 103 so as to create a topic model. The created topic model is a first-language topic model 115 in the case of the first language or a second-language topic model 116 in the case of the second language.

A topic refers to a multi-item distribution of words output by using a topic modeling technique, such as Latent Dirichlet Allocation (LDA) or Labeled LDA. In a topic, a word having a stronger correlation with an associated teacher signal have a higher probability value (score). The topic may also be referred to as a "cluster" or a "latent class".

The topic estimating unit 105 estimates a score of each topic for each text by using a created topic model.

Concerning the first language, the supervised machine learning unit 106 generates learning information 117 by setting topics with scores estimated by the topic estimating unit 105 as features and by using teacher signals for a teacher-signal first-language field-A text information 112T as labels, and performs supervised machine learning on the learning information 117. As the machine learning method, a method, such as Support Vector Machine or Naive Bayes, for directly learning the correlation between a feature and a teacher signal is employed. As a feature, a word sense extracted by the word-sense extracting unit 102 may also be used together with a topic with a score.

The model output unit 107 outputs a learning model 118 as a result of executing machine learning by the supervised machine learning unit 106.

The model input unit 108 reads the learning model 118 to be used for performing classification concerning the second language.

Concerning the second language, by setting topics with scores estimated by the topic estimating unit 105 as features, the category estimating unit 109 estimates a category of each text by using the learning model 118.

Concerning the second language, the classification result output unit 110 outputs, as classification result information 119, information indicating the association between categories estimated by the category estimating unit 109 and texts.

The storage unit 11 stores therein the multilingual document classifying program 111 that allows the controller 10 to operate as the text obtaining unit 100, the word extracting unit 101, the word-sense extracting unit 102, the word-sense teacher signal setting unit 103, the supervised topic modeling unit 104, the topic estimating unit 105, the supervised machine learning unit 106, the model output unit 107, the model input unit 108, the category estimating unit 109, and the classification result output unit 110. The storage unit 11 also stores therein the first-language field-A text information 112, the second-language field-A text information 113, the first-language-and-second-language word-sense information 114, the first-language topic model 115, the second-language topic model 116, the learning information 117, the learning model 118, and the classification result information 119.

Figure 2:
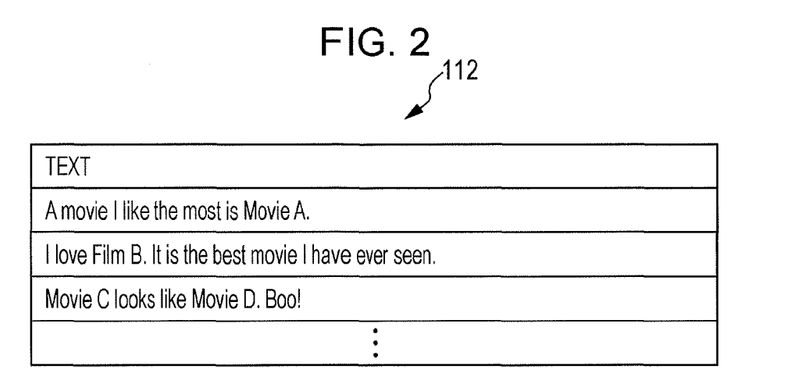
FIG. 2 is a schematic diagram illustrating an example of the configuration of first-language field-A text information.
Figure 8:
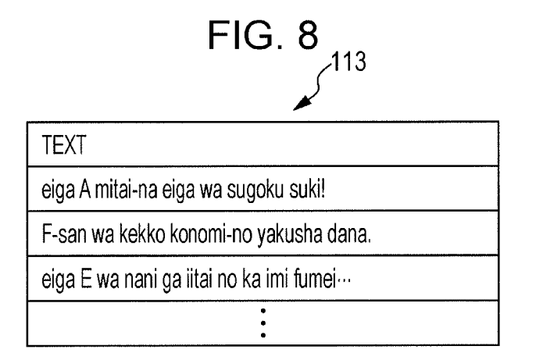
FIG. 8 is a schematic diagram illustrating an example of the configuration of second-language field-A text information.

FIG. 2 is a schematic diagram illustrating an example of the configuration of the first-language field-A text information 112. FIG. 8 is a schematic diagram illustrating an example of the configuration of the second-language field-A text information 113.

The first-language field-A text information 112 indicates plural texts of English as the first language. The second-language field-A text information 113 indicates plural texts of Japanese as the second language. Both of the texts of English and Japanese describe movies as the field A.

Figure 3:
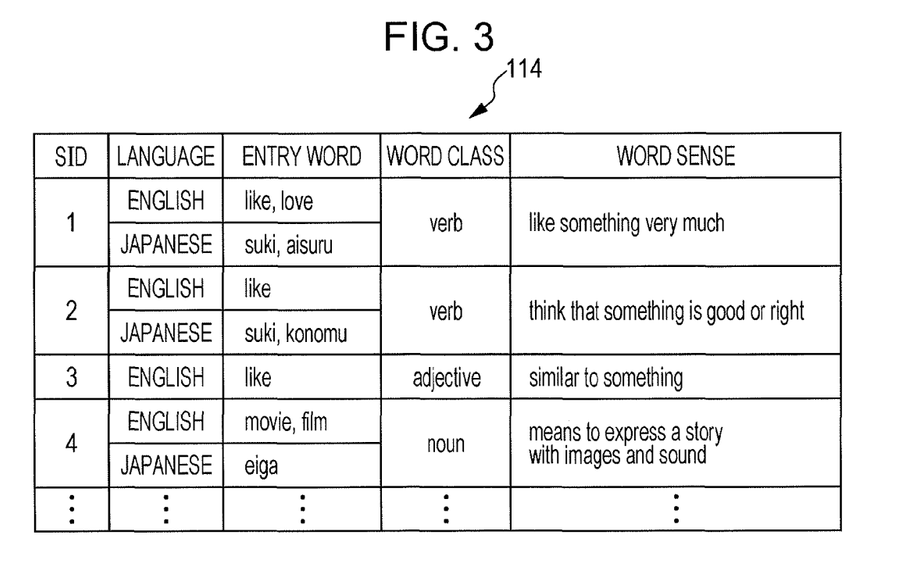
FIG. 3 is a schematic diagram illustrating an example of the configuration of first-language-and-second-language word-sense information.

FIG. 3 is a schematic diagram illustrating an example of the configuration of the first-language-and-second-language word-sense information 114.

The first-language-and-second-language word-sense information 114 is information indicating word senses concerning each of the first language and the second language. The first-language-and-second-language word-sense information 114 indicates a sense identifier (SID) for identifying a word sense, a language indicating the type of language, an entry word indicating a word of each language, a word class of an entry word, and a word sense indicating the meaning of each entry word.

(Operation of Information Processing Apparatus)

The operation of this exemplary embodiment will be described below in terms of (1) first-language learning operation and (2) second-language classifying operation.

(1) First-Language Learning Operation

Figure 4:
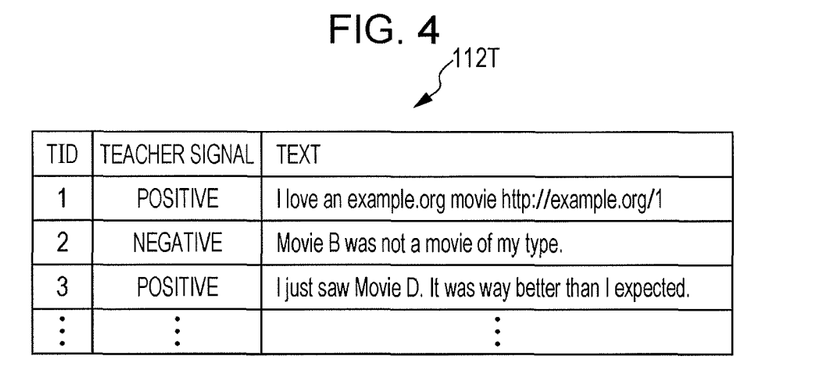
FIG. 4 is a schematic diagram illustrating an example of the configuration of teacher-signal first-language field-A text information.
Figure 7:
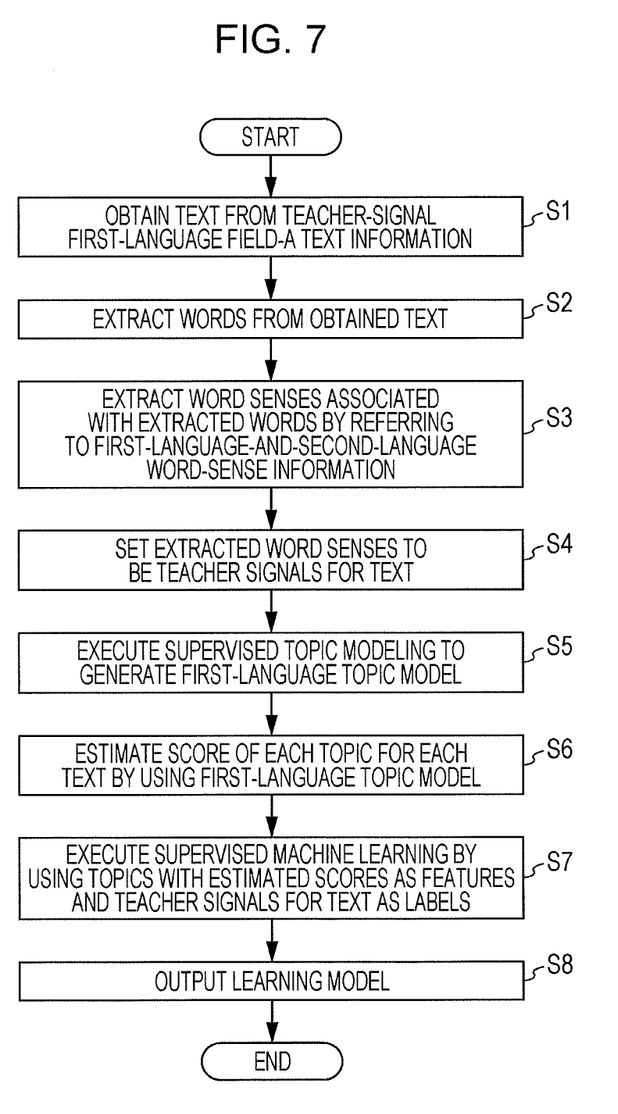
FIG. 7 is a flowchart illustrating an example of a first-language learning operation performed by the information processing apparatus.

FIG. 7 is a flowchart illustrating an example of the first-language learning operation performed by the information processing apparatus 1. FIG. 4 is a schematic diagram illustrating an example of the configuration of the teacher-signal first-language field-A text information 112T.

In step S1, the text obtaining unit 100 first obtains a text with a teacher signal from the first-language field-A text information 112 stored in the storage unit 11. For example, the text obtaining unit 100 obtains a text from the teacher-signal first-language field-A text information 112T shown in FIG. 4. A description will be given below, assuming that "I love an example.org movie http://example.org/1" has been obtained. As the teacher signal, a two-valued signal indicating "positive" or "negative" is shown. However, a multi-valued signal may be used.

Then, in step S2, the word extracting unit 101 extracts words from the text obtained by the text obtaining unit 100. More specifically, the word extracting unit 101 extracts "I", "love", "example.org", "movie", and "http://example.org/1".

Then, in step S3, the word-sense extracting unit 102 extracts word senses corresponding to the words extracted by the word extracting unit 101. More specifically, the word-sense extracting unit 102 extracts "SID=2" and "SID=4" associated with the above-described extracted words by referring to the first-language-and-second-language word-sense information 114 shown in FIG. 3.

Then, in step S4, the word-sense teacher signal setting unit 103 sets the word senses "SID=2" and "SID=4" extracted by the word-sense extracting unit 102 as teacher signals for a text.

Figure 5:
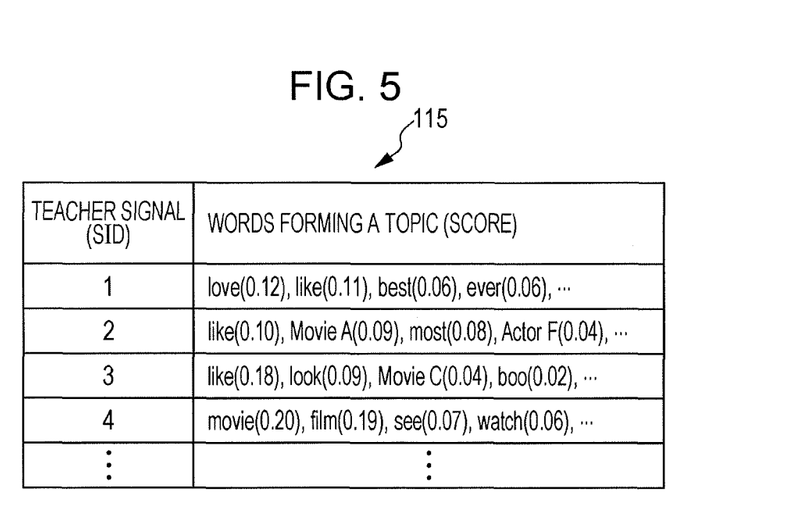
FIG. 5 is a schematic diagram illustrating an example of the configuration of a first-language topic model.

Then, in step S5, the supervised topic modeling unit 104 obtains plural texts with teacher signals, and executes supervised topic modeling on the texts by using the teacher signals set by the word-sense teacher signal setting unit 103, thereby creating the first-language topic model 115 (first topic model) shown in FIG. 5.

FIG. 5 is a schematic diagram illustrating an example of the configuration of the first-language topic model 115.

The first-language topic model 115 includes an SID indicating an associated teacher signal and words forming a topic for each SID. The numeric values in the parentheses following the words indicate scores, and a word having a higher score has a stronger correlation with an associated SID. The words for each topic are arranged in descending order of score. For example, in the word sense of SID=1 indicating "like, love", "love" is used most frequently.

Then, in step S6, the topic estimating unit 105 estimates a score of each topic for each text by using the created first-language topic model 115. For example, concerning the text "I love an example.org movie http://example.org/1", the topic estimating unit 105 estimates scores, such as "SID=1(0.1)", "SID=2(0.3)", "SID=3(0.02)", "SID=4(0.2)", and so on (the numeric values in the parentheses indicate scores). That is, it is estimated from the above-described content of the text that "SID=2", "SID=4", and "SID=1" are word senses having higher scores and that the text has a meaning of "like" than "like, love" and is concerned with the movies.

Figure 6:
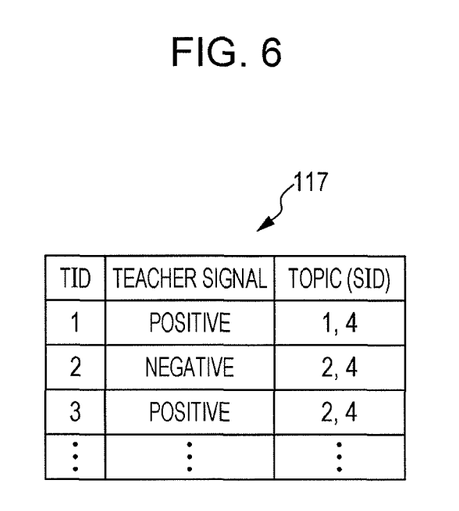
FIG. 6 is a schematic diagram illustrating an example of the configuration of learning information.

Then, in step S7, the supervised machine learning unit 106 generates the learning information 117 shown in FIG. 6 by using the topics with the scores estimated by the topic estimating unit 105 as features and by using the teacher signals described in the teacher-signal first-language field-A text information 112T as labels, and executes supervised machine learning on the learning information 117.

FIG. 6 is a schematic diagram illustrating an example of the configuration of the learning information 117.

The learning information 117 includes a text identifier (TID) for identifying a text, a teacher signal classified for each text, and two SIDs having higher scores among the topics with the scores estimated by the topic estimating unit 105.

In step S8, the model output unit 107 outputs the learning model 118 as a result of executing machine learning by the supervised machine learning unit 106, and stores the learning model 118 in the storage unit 11.

(2) Second-Language Classifying Operation

Figure 11:
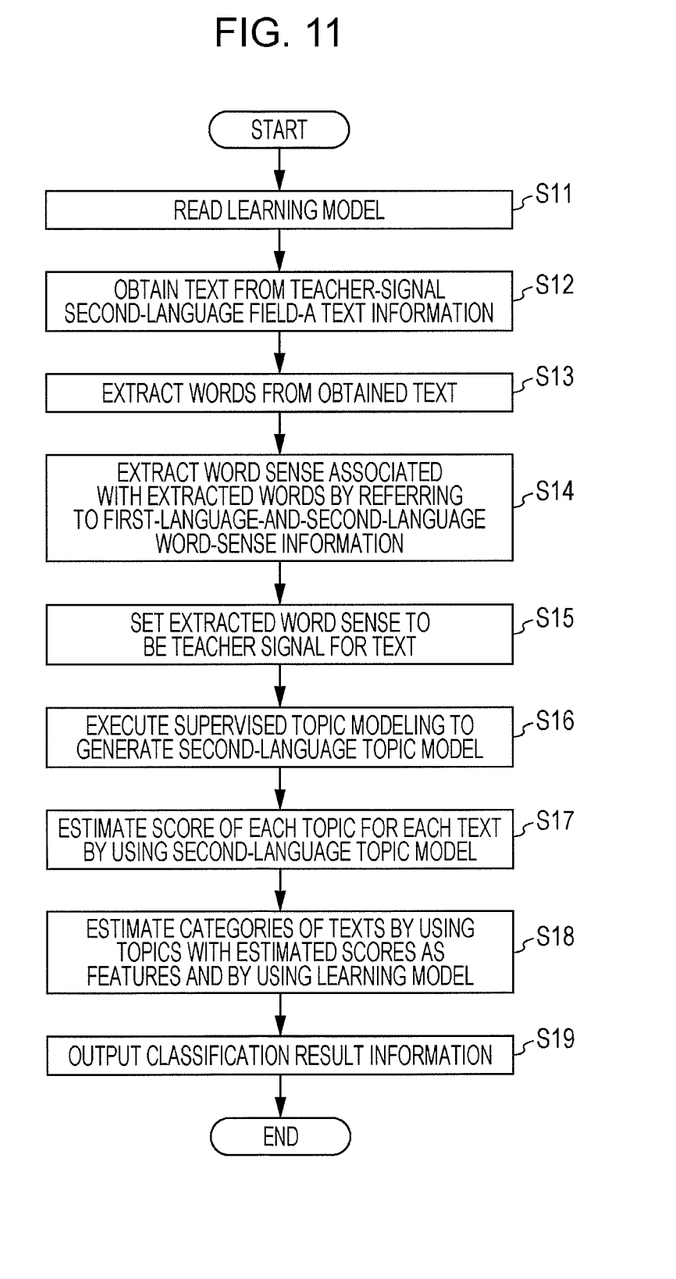
FIG. 11 is a flowchart illustrating an example of a second-language classifying operation performed by the information processing apparatus.

FIG. 11 is a flowchart illustrating an example of the second-language classifying operation performed by the information processing apparatus 1.

In step S11, the model input unit 108 reads the learning model 118 to be used for performing classification concerning the second language. A learning model is generated for each field. In the example of (2) second-language classifying operation, the field A is a subject to be handled, as in the example of (1) first-language learning operation, and thus, the learning model 118 stored in the storage unit 11 in step S8 is read.

Then, in step S12, the text obtaining unit 100 obtains a text to be classified from the second-language field-A text information 113 stored in the storage unit 11. For example, the text obtaining unit 100 obtains a text from the second-language field-A text information 113 shown in FIG. 8. A description will be given below, assuming that "F-san wa kekko konomi-no yakusha dana." ("Mr. F is an actor I like well." in English) has been obtained.

Then, in step S13, the word extracting unit 101 extracts words from the text obtained by the text obtaining unit 100. More specifically, the word extracting unit 101 extracts "F-san (Mr. F)", "kekko (well)", "konomi (like)", and "yakusha (actor)".

Then, in step S14, the word-sense extracting unit 102 extracts a word sense corresponding to the words extracted by the word extracting unit 101. More specifically, the word-sense extracting unit 102 extracts "SID=2" associated with the above-described extracted words by referring to the first-language-and-second-language word-sense information 114 shown in FIG. 3.

Then, in step S15, the word-sense teacher signal setting unit 103 sets the word sense "SID=2" extracted by the word-sense extracting unit 102 as a teacher signal for a text.

Figure 9:
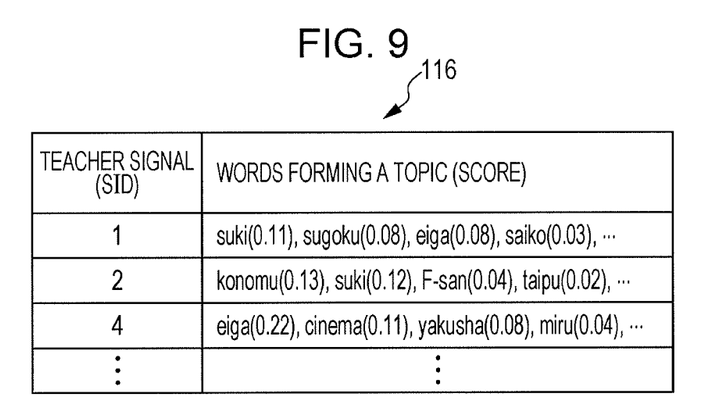
FIG. 9 is a schematic diagram illustrating an example of the configuration of a second-language topic model.

Then, in step S16, the supervised topic modeling unit 104 obtains plural texts with teacher signals, and executes supervised topic modeling on the texts by using the teacher signal set by the word-sense teacher signal setting unit 103, thereby creating the second-language topic model 116 (second topic model) shown in FIG. 9.

FIG. 9 is a schematic diagram illustrating an example of the configuration of the second-language topic model 116.

The second-language topic model 116 includes an SID indicating an associated teacher signal and words forming a topic for each SID.

Then, in step S17, the topic estimating unit 105 estimates a score of each topic for each text by using the created second-language topic model 116. For example, concerning the text "F-san wa kekko konomi-no yakusha dana.", the topic estimating unit 105 estimates scores, such as "SID=1(0.08)", "SID=2(0.3)", "SID=3(0.02)", "SID=4(0.2)", and so on (the numeric values in the parentheses indicate scores). That is, it is estimated from the above-described content of the text that "SID=2" and "SID=4" are word senses having higher scores and that the text has a meaning of "suki (like), konomu (like)" and is concerned with "eiga" (movies).

Then, in step S18, concerning the second language, the category estimating unit 109 estimates a category of each text of the second-language field-A text information 113 by using the topics with the scores estimated by the topic estimating unit 105 as features and by using the learning model 118.

Figure 10:
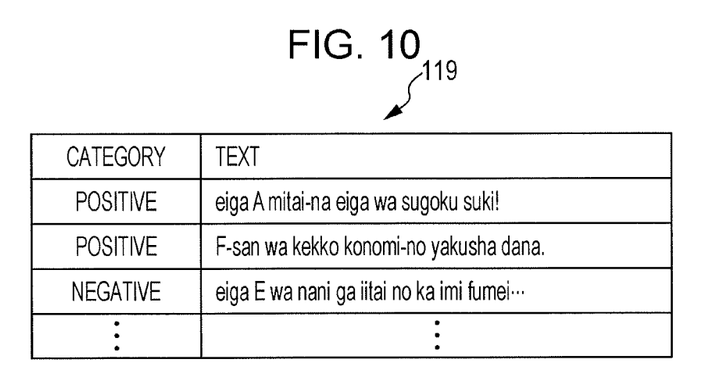
FIG. 10 is a schematic diagram illustrating an example of the configuration of classification result information.

In step S19, concerning the second language, the classification result output unit 110 outputs, as the classification result information 119 shown in FIG. 10, information indicating the association between the categories estimated by the category estimating unit 109 and the texts.

FIG. 10 is a schematic diagram illustrating an example of the configuration of the classification result information 119.

The classification result information 119 indicates texts and categories obtained as a result of performing classification. As the categories, labels similar to those of the teacher signals in the teacher-signal first-language field-A text information 112T are used as shown in FIG. 4. In this exemplary embodiment, a category is represented by a two-valued label. However, if a teacher signal is represented by a multi-valued label, a category may also be represented by a multi-valued label.

In the above-described exemplary embodiment, concerning the first language, topic modeling is executed on the basis of, not words, but word senses, and a topic of each text is estimated. Then, by using an estimated topic as a feature, supervised machine learning is executed. Meanwhile, concerning the second language, a topic of each text is estimated, and each text is classified on the basis of the topic. Thus, a category of a text of the second language may be estimated by using a learning model generated on the basis of the word senses of words in a text of the first language.

Since texts of the first language and those of the second language are concerned with the same field, it is possible to reduce the ambiguity when converting from a word into a word sense.

Additionally, the teacher-signal first-language field-A text information 112T is the only resource for supervised machine learning. Thus, a parallel corpus, which is effective in improving the performance of multilingual document classification, is not necessary, nor does it necessary to translate from the first language to the second language.

Modified Example

The information processing apparatus 1 may also include an unsupervised word-sense disambiguation unit. Then, after extracting a word sense associated with a word in a text in step S3 of FIG. 7, an operation for executing disambiguation of a word sense may be performed in parallel with steps S4 through S6. In a specific disambiguation operation, a score is given to each word sense on the basis of another word which co-occurs in the same text. That is, without the unsupervised word-sense disambiguation unit, in a sentence like "I went to a bank with my dog.", it is not possible to determine whether the word sense of "bank" is a financial institution or a river bank. However, by using the unsupervised word-sense disambiguation unit, since "dog" co-occurs in the text, a higher score is given to a river bank than that to a financial institution, thereby implementing disambiguation of the word sense.

In the above-described exemplary embodiment, the functions of the text obtaining unit 100, the word extracting unit 101, the word-sense extracting unit 102, the word-sense teacher signal setting unit 103, the supervised topic modeling unit 104, the topic estimating unit 105, the supervised machine learning unit 106, the model output unit 107, the model input unit 108, the category estimating unit 109, and the classification result output unit 110 of the controller 10 are implemented by a program. However, all or some of the above-described units may be implemented by hardware, such as an application-specific integrated circuit (ASIC). Alternatively, the program used in the above-described exemplary embodiment may be stored in a recording medium, such as a compact disc-read only memory (CD-ROM), and may be provided. Additionally, swapping, deletion, and addition of steps discussed in the above-described exemplary embodiment may be performed without departing from the spirit of the invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for classifying multilingual documents, the process comprising:

extracting, concerning first document information including a plurality of supervised texts of a first language, a word sense associated with a word included in each of the plurality of supervised texts in the first document information from predetermined word-sense information;

setting an extracted word sense to be a teacher signal for each of the plurality of supervised texts included in the first document information;

creating a first topic model by executing supervised topic modeling on the first document information by using the set teacher signal for each of the plurality of supervised texts included in the first document information;

estimating a topic of each of the plurality of supervised texts included in the first document information by using the created first topic model;

generating a learning model by executing supervised machine learning by using, as a feature, the estimated topic of each of the plurality of supervised texts included in the first document information and by using, as a category, the teacher signal for each of the plurality of supervised texts in the first document information;

extracting, concerning second document information including a plurality of supervised texts of a second language and concerning a field identical to a field of the first document information, a word sense associated with a word included in each of the plurality of supervised texts in the second document information from the predetermined word-sense information;

setting an extracted word sense to be a teacher signal for each of the plurality of supervised texts included in the second document information;

creating a second topic model by executing supervised topic modeling on the second document information by using the set teacher signal for each of the plurality of supervised texts included in the second document information;

estimating a topic of each of the plurality of supervised texts included in the second document information by using the created second topic model; and estimating a category of each of the plurality of supervised texts included in the second document information by using, as a feature, the estimated topic of an associated supervised text and by using the generated learning model.

2. The non-transitory computer readable medium according to claim 1, wherein the process further comprises performing word-sense disambiguation, if there are a plurality of word senses associated with a word in a supervised text of the second language, by determining one of the plurality of word senses on the basis of a co-occurrence probability of another word in the supervised text.

3. An information processing apparatus comprising:
a word-sense extracting unit that extracts, concerning first document information including a plurality of supervised texts of a first language, a word sense associated with a word included in each of the plurality of supervised texts in the first document information from predetermined word-sense information;
a setting unit that sets a word sense extracted by the word-sense extracting unit to be a teacher signal for each of the plurality of supervised texts included in the first document information;
a topic modeling unit that creates a first topic model by executing supervised topic modeling on the first document information by using the teacher signal for each of the plurality of supervised texts included in the first document information set by the setting unit;
an estimating unit that estimates a topic of each of the plurality of supervised texts included in the first document information by using the first topic model created by the topic modeling unit; and
a machine learning unit that generates a learning model by executing supervised machine learning by using, as a feature, the topic of each of the plurality of supervised texts included in the first document information estimated by the estimating unit and by using, as a category, the teacher signal for each of the plurality of supervised texts in the first document information, wherein
concerning second document information including a plurality of supervised texts of a second language and concerning a field identical to a field of the first document information, the word-sense extracting unit extracts a word sense associated with a word included in each of the plurality of supervised texts in the second document information from the predetermined word-sense information,
the setting unit sets a word sense extracted by the word-sense extracting unit to be a teacher signal for each of the plurality of supervised texts included in the second document information,
the topic modeling unit creates a second topic model by executing supervised topic modeling on the second document information by using the teacher signal for each of the plurality of supervised texts included in the second document information set by the setting unit,
the estimating unit estimates a topic of each of the plurality of supervised texts included in the second document information by using the second topic model created by the topic modeling unit, and
the information processing apparatus further comprises a category estimating unit that estimates a category of each of the plurality of supervised texts included in the second document information by using, as a feature, the topic of an associated supervised text estimated by the estimating unit and by using the learning model generated by the machine learning unit.

4. A non-transitory computer readable medium storing a program causing a computer to execute a process for classifying multilingual documents, the process comprising:
extracting, concerning first document information including a plurality of supervised texts of a first language, a word sense associated with a word included in each of the plurality of supervised texts in the first document information from predetermined word-sense information;
setting an extracted word sense to be a teacher signal for each of the plurality of supervised texts included in the first document information;
creating a first topic model by executing supervised topic modeling on the first document information by using the set teacher signal for each of the plurality of supervised texts included in the first document information;
estimating a topic of each of the plurality of supervised texts included in the first document information by using the created first topic model; and
generating a learning model by executing supervised machine learning by using, as a feature, the estimated topic of each of the plurality of supervised texts included in the first document information and by using, as a category, the teacher signal for each of the plurality of supervised texts in the first document information.

5. A non-transitory computer readable medium storing a program causing a computer to execute a process for classifying multilingual documents, the process comprising:
extracting, concerning second document information including a plurality of supervised texts of a second language and concerning a field identical to a field of first document information, a word sense associated with a word included in each of the plurality of supervised texts in the second document information from predetermined word-sense information;
setting an extracted word sense to be a teacher signal for each of the plurality of supervised texts included in the second document information;
creating a second topic model by executing supervised topic modeling on the second document information by using the set teacher signal for each of the plurality of supervised texts included in the second document information;
estimating a topic of each of the plurality of supervised texts included in the second document information by using the created second topic model; and
estimating a category of each of the plurality of supervised texts included in the second document information by using, as a feature, the estimated topic of an associated supervised text and by using a learning model generated on the basis of the first document information.

6. An information processing method comprising:
extracting, concerning first document information including a plurality of supervised texts of a first language, a word sense associated with a word included in each of the plurality of supervised texts in the first document information from predetermined word-sense information;
setting an extracted word sense to be a teacher signal for each of the plurality of supervised texts included in the first document information;
creating a first topic model by executing supervised topic modeling on the first document information by using the set teacher signal for each of the plurality of supervised texts included in the first document information;
estimating a topic of each of the plurality of supervised texts included in the first document information by using the created first topic model;
generating a learning model by executing supervised machine learning by using, as a feature, the estimated topic of each of the plurality of supervised texts included in the first document information and by using, as a category, the teacher signal for each of the plurality of supervised texts in the first document information;

extracting, concerning second document information including a plurality of supervised texts of a second language and concerning a field identical to a field of the first document information, a word sense associated with a word included in each of the plurality of supervised texts in the second document information from the predetermined word-sense information;

setting an extracted word sense to be a teacher signal for each of the plurality of supervised texts included in the second document information;

creating a second topic model by executing supervised topic modeling on the second document information by using the set teacher signal for each of the plurality of supervised texts included in the second document information;

estimating a topic of each of the plurality of supervised texts included in the second document information by using the created second topic model; and estimating a category of each of the plurality of supervised texts included in the second document information by using, as a feature, the estimated topic of an associated supervised text and by using the generated learning model.

* * * * *